United States Patent [19]
Oleksiuk

[11] Patent Number: 5,211,411
[45] Date of Patent: May 18, 1993

[54] ROOFING MATERIAL CARRIER

[76] Inventor: Peter Oleksiuk, 11313-164 Avenue, Edmonton, Alberta, Canada, T5X 3W1

[21] Appl. No.: 850,551

[22] Filed: Mar. 13, 1992

[30] Foreign Application Priority Data

Mar. 13, 1991 [CA] Canada .................................. 2038166

[51] Int. Cl.$^5$ .......................... B62B 3/02; B62B 3/10; B62B 5/04
[52] U.S. Cl. ............................ 280/47.24; 280/47.33; 280/79.11; 280/763.1; 182/45; 248/237
[58] Field of Search ................. 280/32.6, 47.18, 47.24, 280/47.26, 47.27, 47.3, 47.33, 79.11, 79.2, 79.7, 47.17, 763.1, 764.1; 182/45; 188/5

[56] References Cited

U.S. PATENT DOCUMENTS

| | | | |
|---|---|---|---|
| 72,762 | 2/1868 | Taft | 182/45 X |
| 84,595 | 12/1868 | Doren | 182/36 |
| 235,126 | 12/1880 | Calhoun et al. | 248/237 X |
| 543,498 | 7/1895 | Monbeck | 280/43 |
| 590,872 | 9/1897 | Allen | 182/45 |
| 641,109 | 1/1900 | Hinds | 248/237 |
| 852,141 | 4/1907 | Sebree | 248/237 X |
| 993,341 | 5/1911 | Botten | 248/237 |
| 1,016,935 | 2/1912 | Clark | 280/43 |
| 1,028,362 | 6/1912 | King | 182/45 |
| 1,113,068 | 10/1914 | Thomas et al. | 182/45 X |
| 1,143,555 | 6/1915 | Schimmelpfennig | 182/45 |
| 1,243,574 | 10/1917 | Wood | 280/47.33 X |
| 1,423,726 | 7/1922 | Mohr et al. | 182/45 X |
| 2,351,292 | 6/1944 | Rose | 280/47.33 X |
| 5,004,072 | 4/1991 | Launer | 182/45 |

FOREIGN PATENT DOCUMENTS 0272891 10/1989 Fed. Rep. of Germany ........ 182/45

Primary Examiner—Brian Johnson
Attorney, Agent, or Firm—Stanley G. Ade; Adrian D. Battison; Murray E. Thrift

[57] ABSTRACT

A device for supporting roofing material such as shingles, shakes and the like, upon the roof deck to facilitate the installation thereof. It consists of a planar support plate for a bundle of shingles or the like, ahead of the roofer and upon the usually upwardly sloping roof deck. It is supported by two sets of castor wheels on the underside of the deck so that it can be moved readily and easily, upwardly, sideways or at any angle therebetween. A pair of deck engaging gripping members extend rearwardly and downwardly from the front or lower edge of the plate, to prevent downward movement of the assembly. When engaging the deck surface, these are endpointed to engage the deck. When adjacent a wall or when the capping is being installed, these may be replaced with alternate grippers with rubber pads which are pivotably attached to the end sharpened gripping members and which then engage the already laid roof material without damaging same.

12 Claims, 3 Drawing Sheets

ROOFING MATERIAL CARRIER

BACKGROUND OF THE INVENTION

1. Field of the Invention

This invention relates to new and useful improvements in carriers for roofing materials such as asphalt or fiber glass shingles, roof tiles, shakes, pines or interlocks and the like.

Present roofing installation practice normally includes the elevating of bundles of the various types of roofing materials to the roofing surface whereupon they are placed at convenient intervals so that the roofer may have them easily accesible.

However, it is still necessary for the roofer to have to reach and peel off individual shingles or the like and then move them to the desired location whereupon they are secured usually by air operated stapled guns or the like. This is still not only inconvenient and relatively slow but can be somewhat dangerous particularly if the pitch of the roof is fairly steep as is often the case with multistorey buildings. Another disadvantage, particularly with relatively steeply inclined roof surfaces, is the fact that the shingles, individually or in a bundle, may tend to slide downwardly and it will be readily appreciated that any such movement of the shingles and subsequent attempt by the roofer to stop same, may be relatively dangerous.

2. Description of Related Art

Originally, a roofer shingled a course or one line of shingles at a time but with present day materials and power stapling, this is no longer necessary.

Consequently, there were many attempts to provide material carriers for shingles or the like but these only operated in a horizontal direction so that it was difficult to move them upwardly after each course had been completed.

Examples of such shingle carriages are as follows:

Canadian patent 543,498, patented in Jul. 30, 1895, to S.A. Monbeck.

U.S. Pat. No. 84,595, patented Dec. 1, 1868, to F.Van Doren.

U.S. Pat. No. 72,762, patented Dec. 31, 1868, to Charles Taft.

U.S. Pat. No. 641,109, patented Jan. 9, 1900, to J. Hinds.

U.S. Pat. No. 993,341, patented May 30, 1911, to J.J. Botten.

U.S. Pat. No. 1,016,935, patented Feb. 13, 1912, to C. Clark.

It will be noted that all of these used wheels or the like to mount the device but these can only be moved from side to side or horizontally.

SUMMARY OF THE INVENTION

The present invention overcomes many disadvantages inherent with the prior art and in particular provides anti-friction means on the underside of the support plate or platform which permits the carrier to be moved in any direction but primarily horizontally or vertically and any diagonal angle therebetween.

In accordance with the invention there is provided a carrier for roofing materials such as shingles, shakes, tiles and the like, for use upon a roof deck surface, said deck surface usually inclining upwardly from the lower edge thereof, and comprising in combination a substantially planar support plate including a front edge and a rear edge and side edges extending between the extremeties of the front and the rear edges, a plurality of friction reducing means mounted upon the underside of said support plate permitting selective movement of said support plate horizontally and upwardly and in all directions therebetween, upon said deck surface, roof material engaging means along the rear edge of said support plate and gripping means extending downwardly from adjacent said rear edge of said support plate, to prevent downward movement of said carrier upon said deck.

Another advantage of the device is to provide, in the preferred embodiment, castor wheels upon the underside of the carrier plate to permit this universal movement readily and easily together with the fact that gripping means are provided extending downwardly from adjacent the lower or rear edge of the plate and which, permit engagement thereof with the roof deck surface and prevent inadvertent downward movement of the carrier from occurring.

Another advantage is the provision of alternative gripper components having a non-slip base such as serrated rubber or the like, so that the device can be used upon the finished roof surface when adjacent a wall or when capping is proceeding, once again providing inadvertent downward movement of the carrier without doing any damage to the finished roof surface.

Another advantage of the invention is to provide a device of the character herein described which is simple in construction, economical in manufacture and otherwise well suited to the purpose to which is herein described.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

BRIEF DESCRIPTION OF THE DRAWINGS

In the drawings like characters of reference indicate corresponding parts in the different figures.

DETAILED DESCRIPTION OF THE PREFFERRED EMBODIMENT

Figure 1:
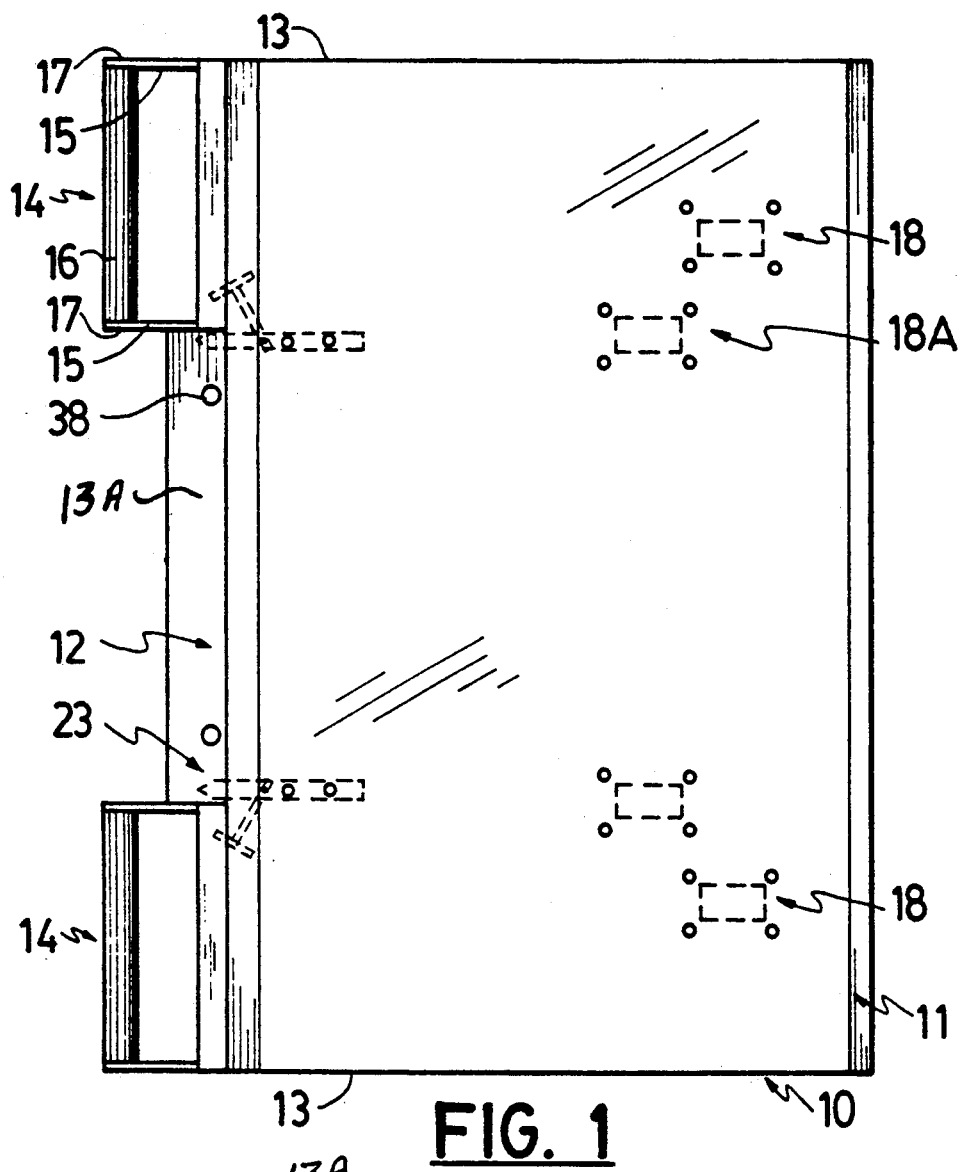
FIG. 1 is a top plan view of the device.

Proceeding therefore to describe the invention in detail, reference character 10 illustrates generally, a substantially rectangular support plate or platform having a front edge collectively designated 11 and a rear edge collectively designated 12 with side edges 13 extending between the extremeties of the front and rear edges thus forming, substantially, a rectangle.

The dimensions of this plate are such that a package of conventional shingles or the like can be supported by the plate when in use so that they are available to a roofer who may peel off these individual shingles or the like, one at a time.

An upwardly and rearwardly sloping retaining plate 13A extends upwardly at an angle from the rear edge 12 and this together with handle assemblies collectively designated 14, adjacent either end of the rear edge, prevents the package of shingles from sliding rearwardly when the assembly is used on a sloping roof deck surface.

The handle assemblies 14 each include a pair of plates 15 in spaced and parallel relationship with one another with a cylindrical handle member 16 extending between the extremeties 17 of the plates. This facilitates the manipulation of the roof material carrier as will hereinafter become apparent.

Situated upon the underside of the support plate 10 is a front pair of friction reducing members collectively designated 18 and which, in the preferred embodiment, consists of castor wheel assemblies having wheels 19 journaled for rotation within forks 20 and supported upon support plates 21 with the forks being mounted for 360° rotation in a conventional manner.

Other friction reducing members can of course be used such as captured ball bearings or the like.

This front pair of castor wheel assemblies are situated just rearwardly of the front edge 11 of the support plate 10 in spaced apart relationship as clearly shown in FIG. 1.

Figure 2:
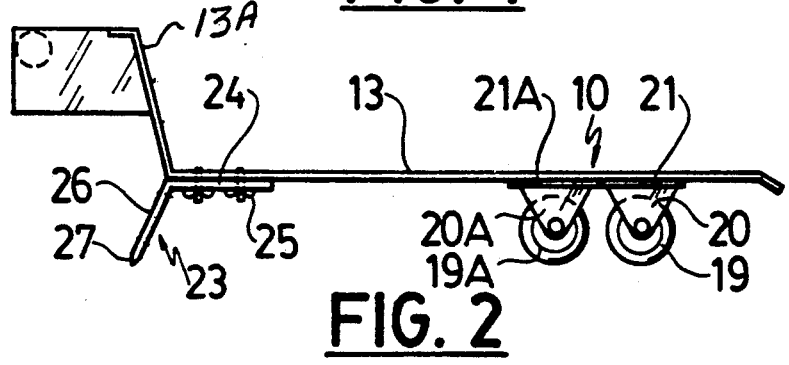
FIG. 2 is a side elevation of the device.
Figure 3:
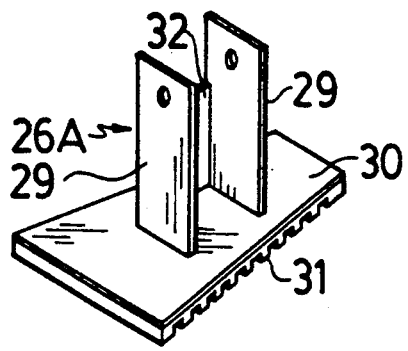
FIG. 3 is an isometric enlarged view of one of the alternative grippers.

Just rearwardly of these members 18 is a further pair of castor wheel assembies or the like identified by reference character 18A and the details of these assemblies are shown in FIG. 2 and given similar numbers to those of the castor wheel assemblies 18 except that the letter "A" has been added as a suffix to the individual components.

These two pairs of castor wheel assemblies facilitate the movement of the carrier in any direction as will hereinafter be described.

When mounted upon a sloping roof deck surface such as that indicated schematically in FIG. 16 by reference character 22, means are required to prevent the entire carrier assembly from sliding downwardly when the device is being used upon a roof deck surfaced with plywood or board, said means may consist of a pair of gripping means collectively designated 23.

These are shown in detail in FIG. 2 and consist of a mounting plate portion 24 secured to the underside of the support plate 10 adjacent the rear edge 12 by means of bolt and wing nut assemblies 25.

Figure 5:
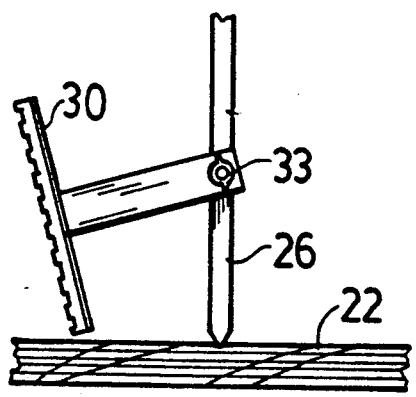
FIG. 5 is a partially schematic view showing, in side elevation, the end sharpened gripper engaging the roof deck with the alternative gripper pivoted out of engagement.

Rearwardly and downwardly extending portions 26 extend from the rear ends of the attaching portions 24 and are slightly end sharpened as at 27 so that they dig into the roof deck surface 22 as shown in FIG. 5.

From the foregoing it will be appreciated that the carrier can be placed upon a roof deck surface 22 and due to the engagement of the gripping assemblies 23, cannot slide downwardly.

However by lifting the rear edge 12 by means of the handle assemblies 14, the gripper assemblies are disengaged from the roof deck surface so that the device can be moved in any direction either horizontally or vertically or any angle therebetween to move same into the next desired convenient location for the roofer, whereupon lowering of the rear edge 12 permits the gripping assemblies 23 to engage the deck in order to prevent downward movement of the carrier.

Figure 6:
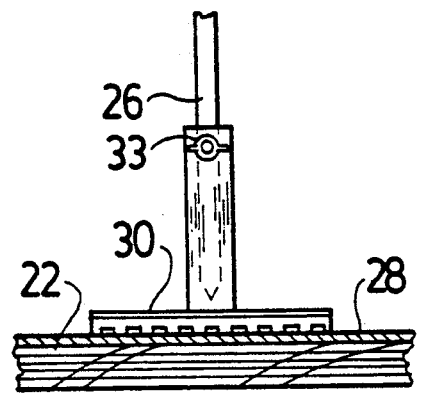
FIG. 6 is a view similar to FIG. 5 but showing the alternative gripper in position and engaging a finished roof surface.

However, if it is desired to move the entire assembly downwardly over the finished surface in order to complete the final course adjacent a wall or to cap a roof, then the gripper assemblies can once again be lowered to engage the finished roof surface indicated by reference character 28 in FIG. 6. Under these circumstances it is not desirable to mar the upper finished surface of the roofing material so that alternate gripper assemblies 26A are provided and shown in detail in FIGS. 3 through 6.

These consist of a pair of spaced and parallel plates 29 secured to and extending upwardly from a substantially rectangular plate 30 upon the underside of which is provided a pad of corrugated flexible material such as rubber or synthetic plastic and indicated by reference character 31.

Figure 4:
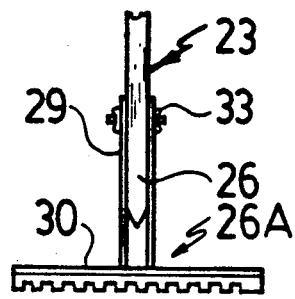
FIG. 4 is a view similar to FIG. 3 but showing this alternative gripper pivotally attached to the lower end portion of the end sharpened gripper.

A back plate 32 spans the plates 29 for support purposes and these gripping assemblies are pivoted to the downwardly and rearwardly extending legs 26 of the gripping assemblies 23, it being understood that in FIG. 4, the gripper assemblies are being viewed in side elevation but in FIGS. 5 and 6, in front elevation.

Wing nuts and bolts 33 secure these additional gripper assemblies to the legs 26 so that the tightness of the attachment can be adjusted to hold them in position shown in FIGS. 4 and 6 as compared to the position shown in FIG. 5. The back plate 32 engages on one of the side edges of the legs 26 and braces the gripper assemblies 26A.

These gripper assemblies pivot sideways relative to the front edge of the support plate 10, outwardly from one another when not in use as in FIG. 5, and inwardly towards one another when in use as in FIGS. 4 and 6.

In FIG. 5, they are shown clear of the legs 26 so that the sharpened ends thereof engages the roof deck surface 22.

In FIG. 6, they have been swung under the end sharpened portion of the leg 26 so that they can be used upon the finished roof surface 28 without damaging same.

Figure 7:
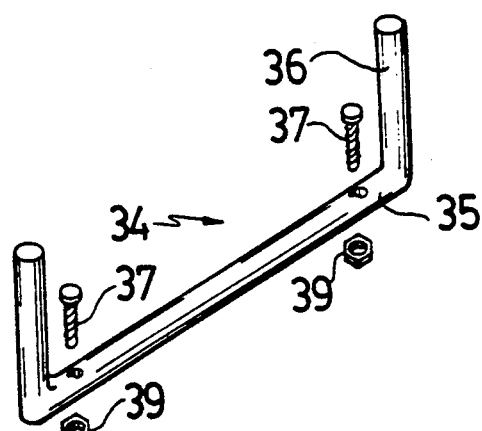
FIG. 7 shows an isometric view of the detachable extension for supporting the rear edges of a bundle of shingles or shakes.

FIG. 7 shows an extension member 34 selectively engageable upon the rear retaining plate 13A in order to support a bundle of wooden shingles or shakes which is usually higher than a corresponding bundle of asphalt shingles due to the difference in weights of the two materials.

It consists of a cross member 35 having upwardly extending arms 36, one at each end thereof, and a pair of bolts 37 which extend through apertures 38 in the retaining plate 13A and are secured by nuts 39 on the lower ends thereof.

Since various modifications can be made in my invention as hereinabove described, and many apparently widely different embodiments of same made within the spirit and scope, it is intended that all matter contained in the accompanying specification shall be interpreted as illustrative only and not in a limiting sense.

I claim:

1. A carrier for roofing materials for use upon a roof deck surface having a lower and upper edges, said deck surface generally inclining upwardly from the lower edge thereof, and comprising in combination a substantially planar support plate including a front edge and a rear edge and side edges extending between ends of the front and the rear edges, a plurality of friction reducing means mounted upon an underside of said support plate permitting selective movement of said support plate horizontally and upwardly and in all directions therebetween upon said deck surface, roof material engaging means connected along the rear edge of an upper surface of said support plate and gripping means extending downwardly from adjacent said rear edge of said support plate underside to prevent downward movement of said carrier upon said deck surface said gripping means includes end sharpened members having end sharpened portions selectively engageable with the associated roof deck surface and alternative gripper means selectively pivoted one to each of said end sharpened members for movement between a roof surface engaging position and a stored position clear of the end sharpened portions of said end sharpened members, said gripper means including a plate having an upper side and an underside surface, a roof surface pad attached on said underside surface and at least one pivot plate support means connected with and extending upwardly from said upper side, pivot means connecting an aligned aperture in said at least one pivot plate support means to an aperture in said end sharpened member providing selective positioning of said gripper means between a roof surface engaging position and a pivoted position whereby said gripper means is clear of said end sharpened portion of said gripping means.

2. The carrier according to claim 1 which includes at least one handle connected to the rear edge of said support plate to facilitate said selective movement thereof.

3. The carrier according to claim 1 in which said friction reducing means comprises a set of castor wheels having at least two castor wheel assemblies mounted upon the underside of said carrier support plate and spaced apart from one another and substantially parallel to the front edge of said support plate.

4. The carrier according to claim 2 in which said friction reducing means comprises a set of castor wheels having at least two castor wheel assemblies mounted upon the underside of said carrier support plate and spaced apart from one another and substantially parallel to the front edge of said support plate.

5. The carrier according to claim 3 which includes a further set of at least two castor wheel assemblies spaced apart from one another and mounted upon the underside of said support plate, rearwardly of said first set of at least two castor wheel assemblies.

6. The carrier according to claim 4 which includes a further set of at least two castor wheel assemblies spaced apart from one another and mounted upon the underside of said support plate, rearwardly of said first set of at least two castor wheel assemblies.

7. A carrier according to claim 3 which includes a selectively engageable upwardly extending extension to said roof material engaging means adjacent the rear edge of said support plate and extending upwardly therefrom when installed, each upwardly extending extension including a lower horizontal member and a pair of spaced and parallel upwardly extending members extending upwardly from said lower horizontal member and spaced in parallel relationship with one another and means for engaging apertures in said roof material engaging means and said lower horizontal member to detachably secure said upward extension to said roof material engaging means.

8. A carrier according to claim 4 which includes a selectively engageable, upwardly extending, extension to said roof material engaging means adjacent the rear edge of said support plate and extending upwardly therefrom when installed, each upwardly extending extension including a lower horizontal member and a pair of spaced and parallel upwardly extending members extending upwardly from said lower horizontal member and spaced in parallel relationship with one another and means for engaging apertures in said roof material engaging means and said lower horizontal member to detachably secure said upward extension to said roof material engaging means.

9. A carrier according to claim 1 which includes a selectively engageable, upwardly extending, extension to said roof material engaging means adjacent the rear edge of said support plate and extending upwardly therefrom when installed, each upwardly extending extension including a lower horizontal member and a pair of spaced and parallel upwardly extending members extending upwardly from said lower horizontal member and spaced in parallel relationship with one another and means for engaging apertures in said roof material engaging means and said lower horizontal member to detachably secure said upward extension to said roof material engaging means.

10. A carrier according to claim 2 which includes a selectively engageable, upwardly extending, extension to said roof material engaging means adjacent the rear edge of said support plate and extending upwardly therefrom when installed, each upwardly extending extension including a lower horizontal member and a pair of spaced and parallel upwardly extending members extending upwardly from said lower horizontal member and spaced in parallel relationship with one another and means for engaging apertures in said roof material engaging means and said lower horizontal member to detachably secure said upward extension to said roof material engaging means.

11. A carrier according to claim 5 which includes a selectively engageable, upwardly extending, extension to said roof material engaging means adjacent the rear edge of said support plate and extending upwardly therefrom when installed, each upwardly extending extension including a lower horizontal member and a pair of spaced and parallel upwardly extending members extending upwardly from said lower horizontal member and spaced in parallel relationship with one another and means for engaging apertures in said roof material engaging means and said lower horizontal member to detachably secure said upward extension to said roof material engaging means.

12. A carrier according to claim 6 which includes a selectively engageable, upwardly extending, extension to said roof material engaging means adjacent the rear edge of said support plate and extending upwardly therefrom when installed, each upwardly extending extension including a lower horizontal member and a pair of spaced and parallel upwardly extending members extending upwardly from said lower horizontal member and spaced in parallel relationship with one another and means for engaging apertures in said roof material engaging means and said lower horizontal member to detachably secure said upward extension to said roof material engaging means.

* * * * *